Nov. 15, 1932.  A. WALLACE  1,888,190
OIL ELECTRIC LOCOMOTIVE
Filed July 23, 1931   5 Sheets-Sheet 3
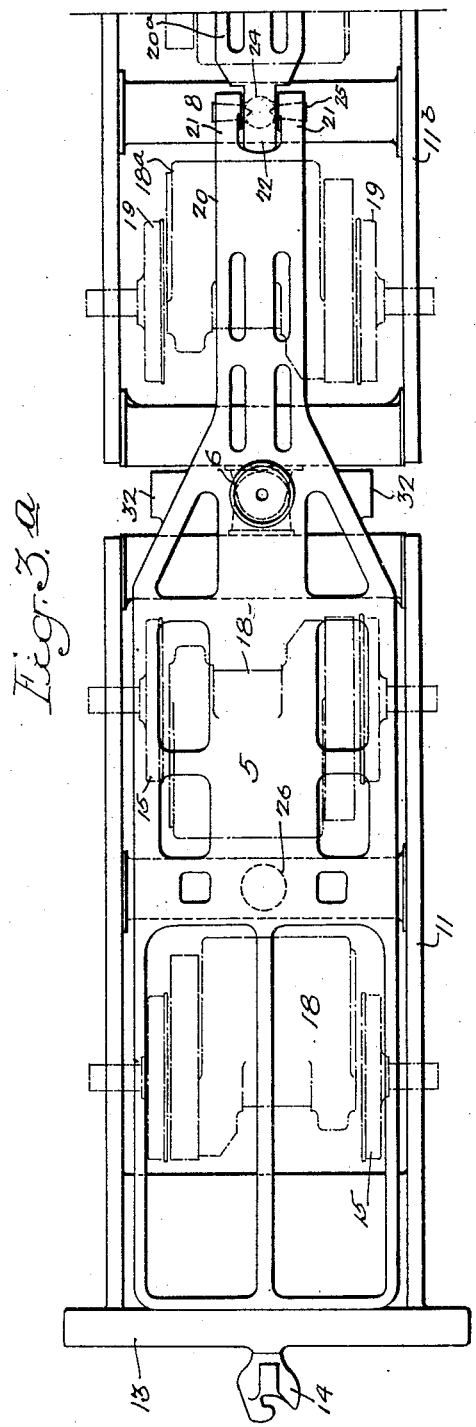
Inventor:-
Allen Wallace
by his Attorneys

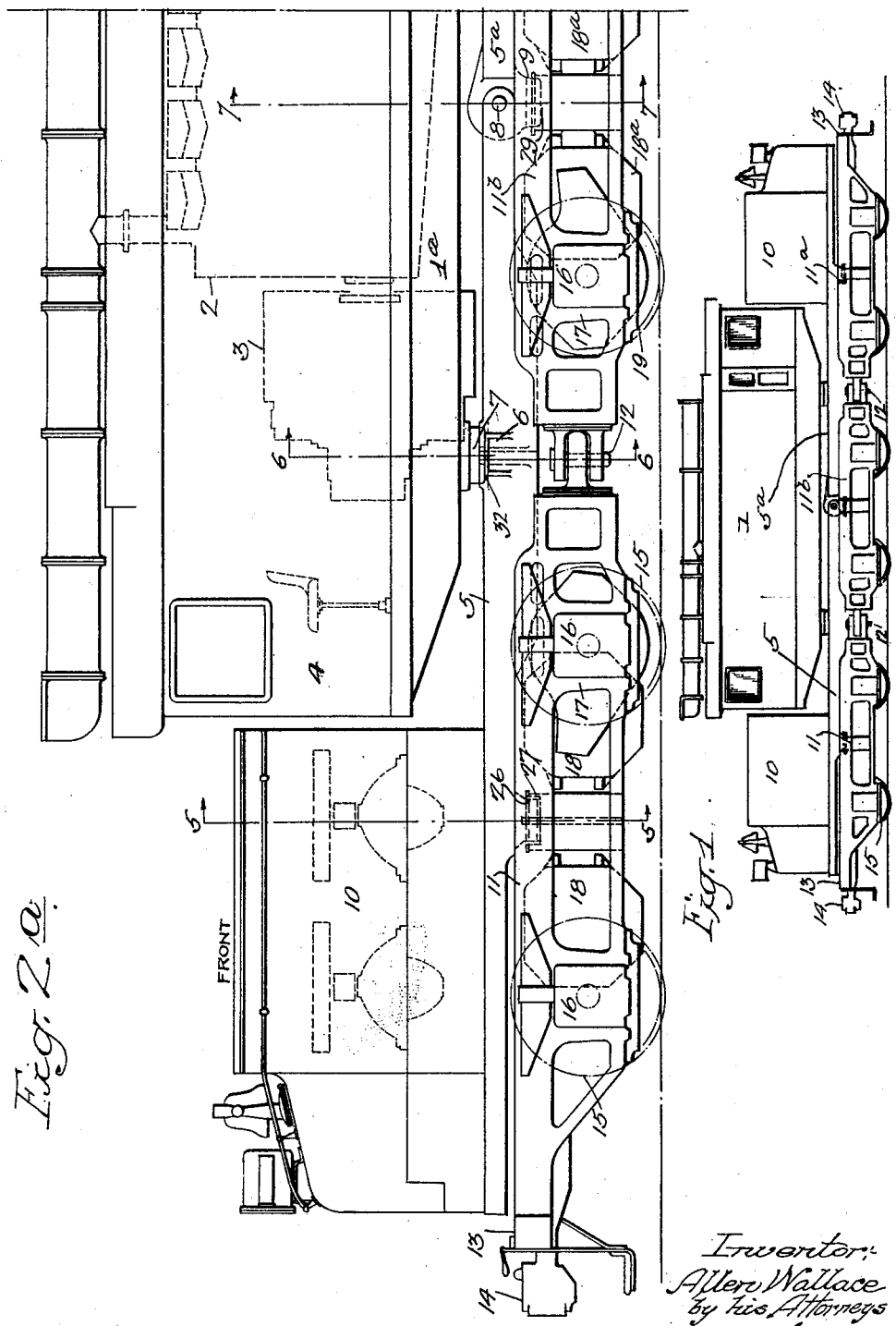

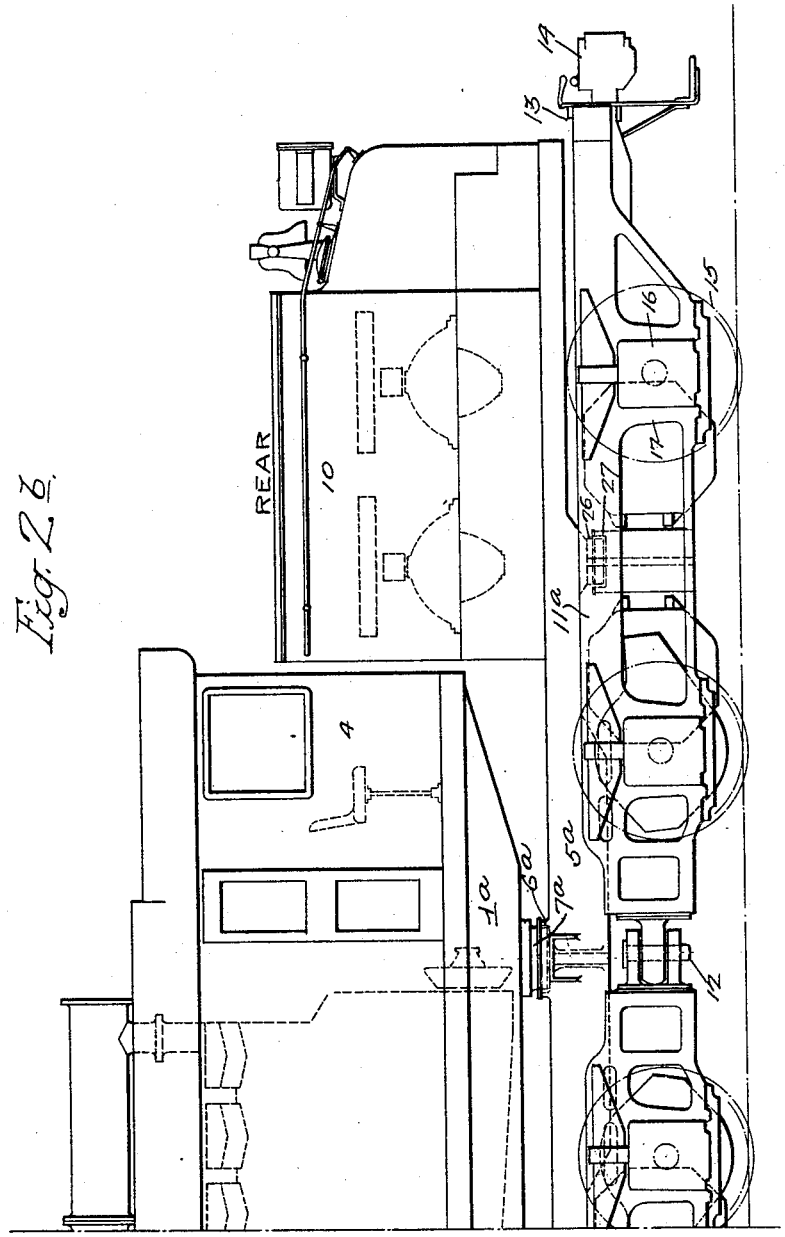

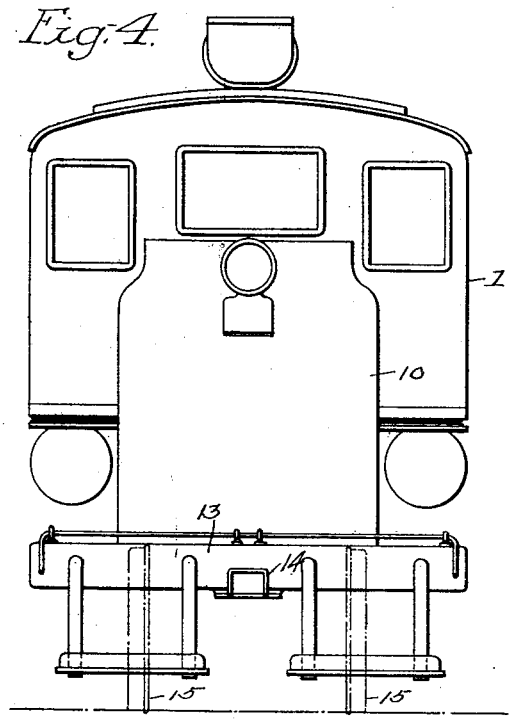
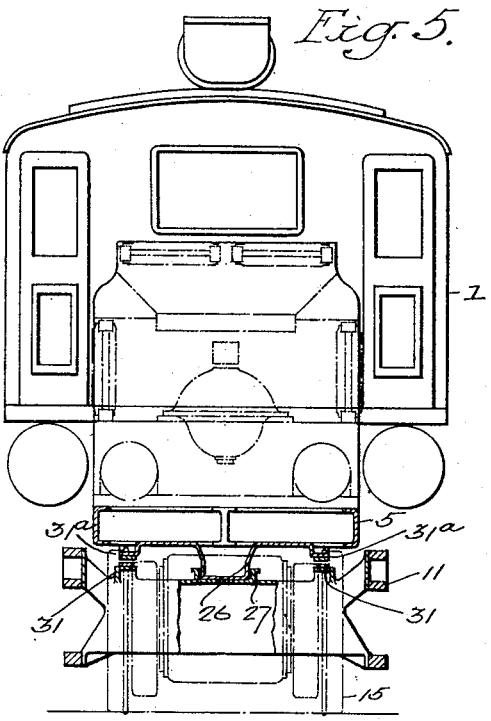
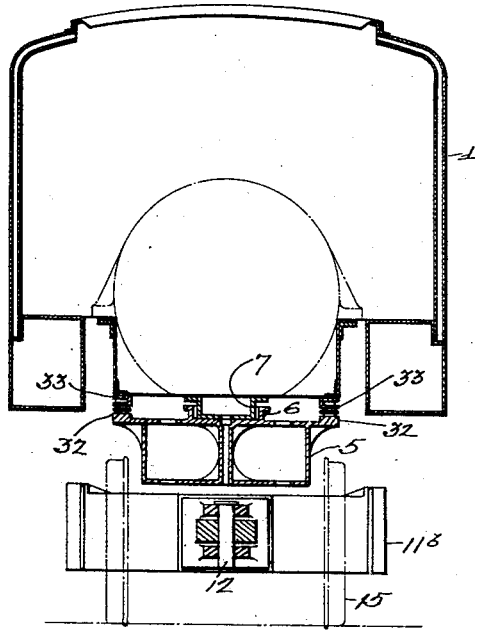
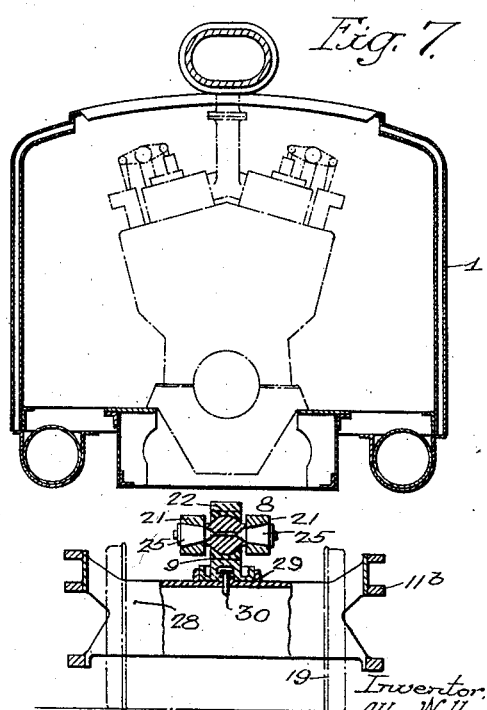

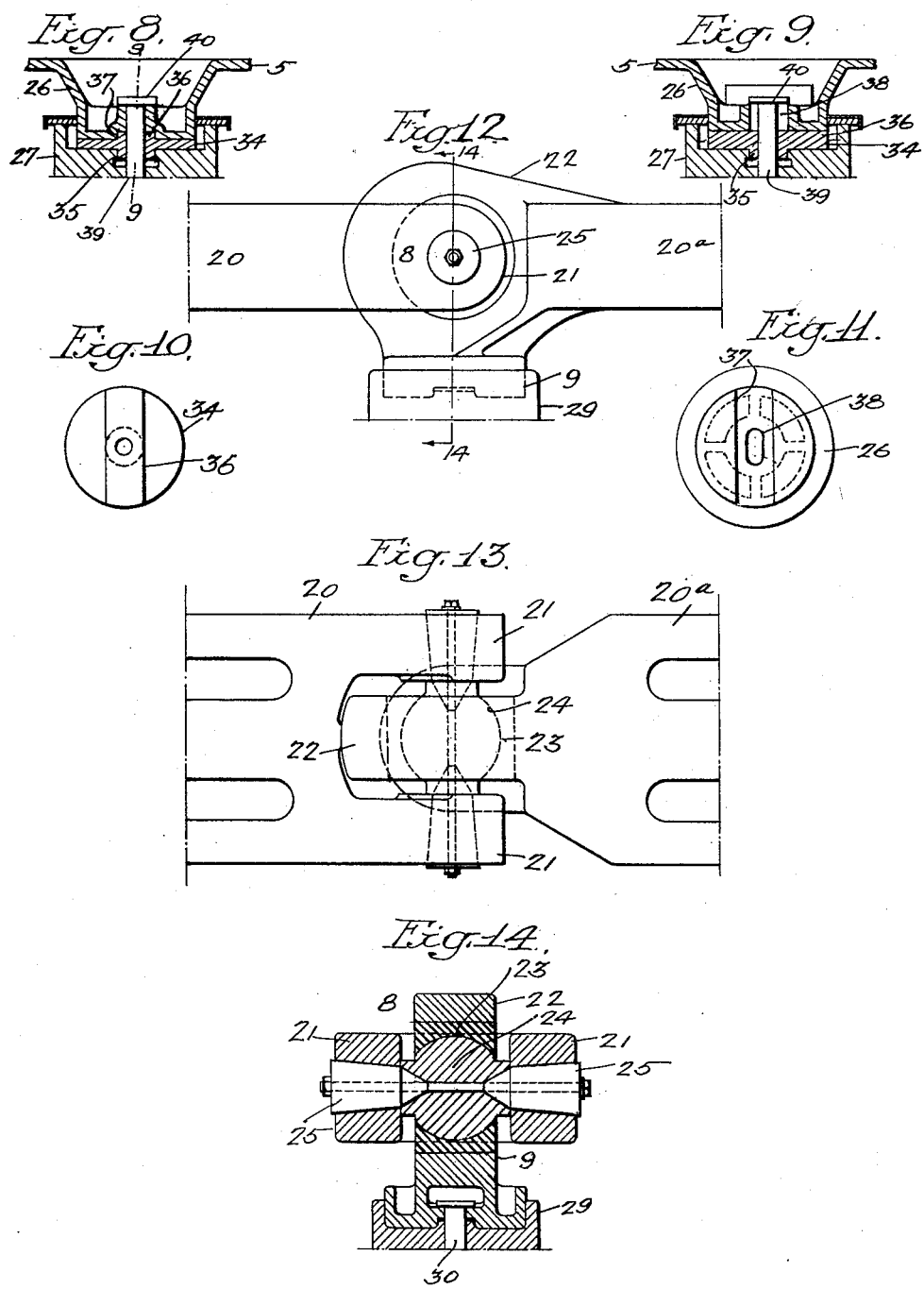

Patented Nov. 15, 1932

1,888,190

UNITED STATES PATENT OFFICE

ALLEN WALLACE, OF MOORESTOWN, NEW JERSEY

OIL-ELECTRIC LOCOMOTIVE

Application filed July 23, 1931. Serial No. 552,714.

This invention relates to electrically propelled vehicles and particularly to the type of locomotive that has a power plant in the cab which supplies current through motors to the axles of the trucks. The power plant consists of an oil engine which drives a generator which supplies the current for the motors.

One object of the invention is to provide a locomotive of the articulated type, so that the running gear will be flexible for operation on a curved track.

A further object of the invention is to mount on the bumpers, the draft gears and couplers on the outside ends of the end trucks, for the purpose of taking tractive effort and buffing strains through the main frames of the trucks.

A still further object of the invention is to provide an articulated hinged joint between the trucks for the purpose of connecting all the trucks together.

A further object of the invention is to so design the sub-frames that hoods can be mounted on the ends of the frames, which will contain auxiliary apparatus.

A still further object of the invention is to so design the center pin of each outside truck to take care of a foreshortening of the longitudinal distance between the center pins of the middle and the outside trucks when the locomotive is entering or leaving a curved track.

A further object of the invention is to mount the cab between the center pin of the middle truck and the center pins of the outer trucks, so as to balance the overhanging mass of the hoods located at the outer ends of the sub-frames, so that the weight is properly distributed on the truck center pins.

In the accompanying drawings:

Fig. 1 is a diagrammatic side view of my improved oil electric locomotive;

Fig. 2a is a side view of one-half of the oil electric locomotive;

Fig. 2b is a side view of the other half of the locomotive;

Fig. 3a is a plan view showing the sub-frame of that half of the locomotive illustrated in Fig. 2a;

Fig. 3b is a plan view of the sub-frame of that portion of the locomotive shown in Fig. 2b;

Fig. 4 is an end view of the locomotive;

Fig. 5 is a transverse sectional view on the line 5—5, Fig. 2a;

Fig. 6 is a sectional view on the line 6—6, Fig. 2a;

Fig. 7 is a sectional view on the line 7—7, Fig. 2a;

Fig. 8 is a sectional view of the movable center pin and plate;

Fig. 9 is a sectional view on the line 9—9, Fig. 8;

Fig. 10 is an inverted plan view of the center pin shown in Fig. 8;

Fig. 11 is a detached plan view of the key plate shown in Fig. 8;

Fig. 12 is a side view of the center pin and articulation of the sub-frame;

Fig. 13 is a plan view of the mechanism shown in Fig. 12; and

Fig. 14 is a sectional view on the line 14—14, Fig. 12.

Referring to the drawings: 1 is the cab of the locomotive, in which is an oil engine 2, an electric generator 3, and the parts connected therewith. This cab is mounted on a cab frame 1a, having at each end a space 4 for the operator, and in this space is the controlling mechanism, which is not shown in the present instance. 5 is the front sub-frame and 5a is the rear sub-frame in the present instance, and each frame has a center bearing 6—6a for the center pins 7—7a of the cab frame 1a. The two sub-frames 5 and 5a are connected by an articulated joint 8, on which is a center pin 9. On the outer end of each sub-frame is a hood 10, which may contain auxiliary apparatus of the oil electric power plant in the cab, and on which can be mounted the bell and head light.

The hoods extend above the cab frame for a given distance but not to such an extent as to interfere with the view of the operator of the locomotive. The locomotive is provided with three sets of trucks 11, 11a and 11b, which are coupled together by pins 12 in the present instance. The sub-frames are supported by the three trucks and the weight of the sub-frames, the cab frame and the driving mechanism within the cab, is carried by the three trucks. Each end truck 11 and 11a extends beyond the hoods at the outer ends of the sub-frames and has the usual bumpers 13 and couplers 14. Each truck in the present instance is a 4-wheel truck having wheels 15, the axles of which are mounted in boxes 16 in the side frames 17. 18 are motors suitably supported by the trucks and arranged to drive the axles of the wheels 15. The generator 3 supplies the necessary current to all of the motors. In the present instance the wheels 19 of the center truck 11b are mounted on axles which are driven by motors 18a, so that the axles of all the trucks are driven axles.

The sub-frames 5—5a are made as shown in the plan views, Figs. 3a and 3b, and the parts beyond the center pins 7 are substantially the full width of the locomotive, while the inner portions 20—20a, which are coupled together, are reduced in width, being comparatively narrow, and the two parts are coupled together by an articulated joint 8, mentioned above.

In the present instance the part 20 has two jaws 21 spaced apart for the reception of a tongue 22 on the part 20a, and in this tongue is a socket 23 for a ball 24. Engaging this ball are two tapered pins 25, which extend into tapered openings in the ball, the pins being mounted in the jaws 21. This articulated joint allows lateral and horizontal movements to a limited extent of both sub-frames 5—5a and allows each sub-frame to accommodate itself to any unevenness in the track. On the tongue 22 is a center pin 9 which rests on a center pin bearing 29 on the central truck 11b. This center pin 9 is held in place by a pin 30, extending into an opening in the transom 28 of the central truck 11b. While the center truck supports the inner ends of the sub-frames 5—5a, the truck is free to accommodate itself to the track. The end trucks 11—11a have side bearings 31, above which are the side bearings 31a on the sub-frames. The central truck, however, is not provided with side bearings but there are side bearings 32 on the sub-frames, which are directly under the side bearings 33 on the cab.

The end trucks 11—11a have center bearings 27 for the center pins 26 projecting from the underside of the sub-frames 5—5a and these pins 26 have a certain amount of longitudinal movement in their bearings, so as to accommodate the foreshortening of the longitudinal distance between center pins of the middle truck and the outside trucks when the locomotive is passing over a curved track. Details of these bearings will be described hereinafter.

The front center pin 7 of the cab frame 1a has no longitudinal movement in its bearing 6 but the rear center pin 7a has a slight longitudinal movement in its center bearing 6a so that the sub-frames will accommodate themselves to the curve of the track. The construction of this center pin and bearing is similar to the bearings 26 and 27 of the forward and rear trucks. In the present instance in Figs. 8 to 11 I have illustrated one form of center bearing allowing slight longitudinal movement of the trucks in respect to the sub-frames. Located in the bearing 27 is a plate 34, having a hub 35 which extends into an opening in the center bearing 27, holding the plate in the central position. On this plate is a rib 36, forming the key which extends into a slot 37 in the underside of the pin 26, and in this pin 26 is a slot 38, through which a bolt 39 extends, which ties the parts together, and this bolt has an enlarged head 40, which extends over the slot. By this construction the center pin 26 can slide longitudinally on the plate 34, being guided by the rib or key 36, but the movement is limited by the length of the slot 38 in the pin 26. The movement, however, is sufficient to allow the end trucks to accommodate themselves to a curvature of the track, while the pivot pin 9 is adapted to the center pin bearing 29 of the center truck and is held against any movement except a rotary movement. As stated above, the center pin 7 on the cab frame 1a and its bearing 6 is similar to the center bearing of the central truck, having no other movement except a slight rotary movement, but the rear bearing 6a on the cab frame 1a is constructed in a manner similar to the center pins 26 at the front and rear of the sub-frames, which have their bearings in the front and rear trucks. The particular form of center bearings which allow for the longitudinal movement of the front and rear trucks and the rear sub-frames may be modified without departing from the essential features of the invention.

It will be seen by the above construction that the articulated locomotive has a very flexible running gear which will operate on a curved track. The two sub-frames are connected by an articulated joint over the center of the central truck, and this articulated joint is supported by the center bearing of the truck. The outer ends of the sub-frames carry the hoods, which may contain auxiliary apparatus of the oil electric power plant in the cab of the locomotive, and are carried by the end trucks.

By constructing the center pins of the end trucks so that they will allow for foreshortening of the longitudinal distance between the center pin bearings of the middle and outside trucks, they will allow the locomotive to pass freely over curves.

It will be noticed that the cab is supported on the sub-frames at such a point that the cab will balance the overhanging masses of hood located at the outer ends of the sub-frames.

This insures the proper distribution of weight on the truck center pins, and the rear center pin is constructed to allow the foreshortening of the longitudinal distance between the center bearings when the locomotive is passing over a curved track.

It will be noticed that each outer truck is provided with side bearings which are directly below the side bearings on the sub-frames, while the central truck has no side bearings but is provided with a specially constructed center pin and an articulated connection between the two sub-frames. This connection allows the sub-frame over the front truck to assume an independent position different from the sub-frame over the back truck.

I claim:

1. The combination in an electric locomotive, of three 4-wheel trucks pivotally connected; motors for driving the axles of the trucks; two sub-frames connected together at the center of the locomotive, each sub-frame being pivotally mounted on the center of the end trucks, the inner ends of the sub-frames, which are connected, being pivotally mounted on the central truck; a cab pivotally mounted on each sub-frame between the bearings on the trucks; and a generator mounted in the cab for driving the motors on the trucks.

2. The combination of three motor driven trucks coupled together; two sub-frames mounted above the trucks and extending substantially the full lengths of the three trucks; a universal joint connecting the two sub-frames at the center of the locomotive, said universal joint bearing upon the center of the central truck, the sub-frames near each end bearing upon the end trucks; and a cab mounted above the sub-frames and pivotally mounted on said frames at points above the connections of the end trucks with the center truck.

3. The combination of three motor driven trucks coupled together; two sub-frames mounted above the trucks and extending substantially the full length of the three trucks; a universal joint connecting the two sub-frames at the center of the locomotive, said universal joint bearing upon the center of the central truck, the sub-frames near each end bearing upon the end trucks; a cab mounted above the sub-frames and pivotally mounted on said frames at points above the connections of the end trucks with the center truck, said cab being shorter than the combined sub-frames; and a hood mounted on each sub-frame beyond the ends of the cab.

4. The combination of three trucks coupled together; motors on the trucks; a bumper and coupling on the outer end of each end truck; two sub-frames connected by universal joints at the center of the locomotive and extending substantially the full length of the locomotive, said sub-frames being pivotally mounted on the center of the end trucks, and the universal joint being supported at the center of the central truck; a cab mounted above the inner portions of the sub-frames and pivoted on the sub-frames directly above the couplings between the center truck and the end trucks; and a generator mounted in the cab supplying current to the motors.

5. The combination of three trucks; couplings pivotally connecting the trucks; two sub-frames mounted above the trucks and extending substantially the full length of the trucks; couplings connecting the sub-frames, said sub-frames being pivotally mounted at the center of each end truck and the coupling of the two frames being supported by the intermediate truck, the inner ends of each sub-frame being reduced in width; and a cab mounted above the inner ends of the sub-frames and pivotally mounted on said sub-frames substantially in line with the couplings connecting the trucks.

6. The combination of three trucks pivotally connected; two sub-frames mounted on the trucks and extending substantially the full length of the trucks, one of said frames having a jaw at its inner end, the other sub-frame having a tongue extending between the jaws; a ball mounted in the tongue; pivot pins mounted on the jaws and engaging the ball and providing a universal joint; and a cab mounted above the sub-frames.

7. The combination of three trucks pivotally connected; two sub-frames mounted on the trucks and extending substantially the full length of the trucks, one of said frames having a jaw at its inner end, the other sub-frame having a tongue extending between the jaws; a ball mounted in the tongue; pivot pins mounted on the jaws and engaging the ball and providing a universal joint; a cab mounted above the sub-frames, said tongue having a center pin projecting downwardly therefrom; and a center bearing on the central truck for said center pin.

8. The combination in an electric locomotive, of three trucks pivotally connected; two sub-frames pivotally mounted above the trucks; a universal joint connecting the inner ends of the two sub-frames; and a cab mounted above the sub-frames and pivotally mounted on said sub-frames at a point substantially in line with the couplings connecting the three trucks, said cab being of less length than the combined sub-frames.

9. The combination in an electric locomotive, of three trucks; vertical coupling pivot pins connecting the trucks; motors on the trucks for driving the wheels thereof, the outer trucks having a bumper and coupling, each truck having center pin bearings; two sub-frames extending substantially the full length of the locomotive; a universal joint connecting the inner ends of said frames, one of the frames having a center pin located in the center bearing of the center truck, each frame having center pins resting in the center bearings of the end trucks; and a cab frame pivotally mounted on the sub-frames.

10. The combination in an electric locomotive, of three trucks pivotally connected; two sub-frames mounted on the trucks; a universal coupling connecting the inner ends of the said sub-frames, said sub-frames extending substantially the full length of the locomotive; a cab frame less in length than the combined sub-frames, and pivotally mounted upon said frames; a cab on the cab frame; and a hood at each end of each frame beyond the cab, said hood being less in height than the cab.

11. The combination in an electric locomotive, of three trucks pivotally connected; two sub-frames mounted above the trucks; a universal joint connecting the inner ends of the sub-frames, said sub-frames extending substantially the full length of the locomotive, each truck having a center bearing, the universal joint having a center pin mounted in the bearing of the center truck; center pins on each sub-frame some distance from the end thereof, mounted in the center bearings of the end trucks; side bearings on the end trucks directly below the side bearings, depending from the sub-frames; and a cab pivotally mounted on the sub-frames.

12. The combination of three trucks pivotally connected; two sub-frames mounted on the said trucks; a universal joint connecting the inner ends of the sub-frames, said sub-frames having pivot pins, and the end trucks having center bearings for said pivot pins, the universal joint having a depending center pin, the center truck having a center bearing for said pin; side bearings on each of said end trucks and depending side bearings on the sub-frames directly above the side bearings of said trucks; a cab frame mounted above the sub-frames, such sub-frames having center bearings; center pins on the cab frame mounted in the said bearings; side bearings on the sub-frames on each side of the center pin; and side bearings on the cab frame directly above the side bearings of the sub-frames.

13. The combination in an electric locomotive, of three trucks pivotally connected; two connected sub-frames mounted above the trucks and supported thereby; a center bearing on each truck; a pivot pin at the connection of the sub-frames mounted on the center bearing of the center truck; and a pin on each sub-frame adapted to a bearing on the end trucks, the latter pins having a certain amount of longitudinal movement in the center bearings to take care of the foreshortening of the longitudinal distance between the center pin of the center truck and the center pins of the end trucks when the locomotive is on a curved track.

14. The combination in an electric locomotive, of three 4-wheel trucks pivotally connected with vertical pivot pins, the two end trucks having bumpers and couplings; two sub-frames mounted on the three trucks; a universal joint coupling the inner ends of the sub-frames at the center of the central truck, the said joint supported by the said central truck; a cab frame extending partially over the sub-frames and pivoted to the sub-frames some distance each side of the universal joint; and hoods on each end of the sub-frames beyond the cab, the pivot connections of the cab with the sub-frames being such that the overhanging mass of the hoods will be balanced to insure the proper weight distribution on truck center pins, which in turn distribute the weight to the rails.

15. The combination in an electric locomotive, of three trucks pivotally connected; two sub-frames mounted above the trucks and supported thereby; a center bearing on each truck; a pivot pin at the connection of the two sub-frames bearing upon the center bearing of the central truck; a pivot pin on each sub-frame some distance from the connection of the two sub-frames and mounted on the center bearings of the end trucks, said pins having a given amount of longitudinal movement in their bearings to allow the locomotive to pass over curves; a cab frame mounted above the two sub-frames and having two center pins spaced apart; and a center bearing on each sub-frame in which the center pins of the cab frame are located, one of said center pins having a given amount of longitudinal movement in its bearing to allow for the movement of the sub-frames in passing around curves.

16. The combination in an electric locomotive, of a series of trucks pivotally connected; two sub-frames pivotally mounted on the trucks; and a cab frame mounted on the sub-frames, some of the pivot connections being free to turn only, while others are free to turn and to move longitudinally a given extent to allow the engine to pass around curves.

ALLEN WALLACE.